United States Patent
Bahn et al.

(10) Patent No.: US 10,040,937 B2
(45) Date of Patent: Aug. 7, 2018

(54) POLYCARBONATE RESIN COMPOSITION AND OPTICAL MOLDED PRODUCT COMPRISING THE SAME

(71) Applicant: LG CHEM, LTD., Seoul (KR)

(72) Inventors: Hyong Min Bahn, Daejeon (KR); Byoung Kyu Chun, Daejeon (KR); Un Ko, Daejeon (KR); Moo Ho Hong, Daejeon (KR); Young Young Hwang, Daejeon (KR); Min Jeong Kim, Daejeon (KR); Jung Jun Park, Daejeon (KR); Ki Jae Lee, Daejon (KR); Young Wook Son, Daejon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/501,098

(22) PCT Filed: Mar. 31, 2016

(86) PCT No.: PCT/KR2016/003339
§ 371 (c)(1),
(2) Date: Feb. 1, 2017

(87) PCT Pub. No.: WO2016/200032
PCT Pub. Date: Dec. 15, 2016

(65) Prior Publication Data
US 2017/0218198 A1    Aug. 3, 2017

(30) Foreign Application Priority Data

Jun. 12, 2015  (KR) .................. 10-2015-0083680
Sep. 21, 2015  (KR) .................. 10-2015-0133051
Mar. 30, 2016  (KR) .................. 10-2016-0038477

(51) Int. Cl.
| | | |
|---|---|---|
| C08L 69/00 | (2006.01) | |
| G02B 6/00 | (2006.01) | |
| G02B 1/04 | (2006.01) | |
| F21V 8/00 | (2006.01) | |

(52) U.S. Cl.
CPC .............. *C08L 69/00* (2013.01); *G02B 1/045* (2013.01); *G02B 6/0065* (2013.01); *C08L 2205/03* (2013.01)

(58) Field of Classification Search
CPC ... C08L 69/00; C08L 2205/03; G02B 6/0065; G02B 1/045
USPC ........................................................ 524/377
See application file for complete search history.

(56) References Cited

U.S. PATENT DOCUMENTS

| | | | |
|---|---|---|---|
| 6,011,149 A | 1/2000 | Francotte | |
| 6,984,694 B2 | 1/2006 | Blasius, Jr. et al. | |
| 9,097,838 B2 * | 8/2015 | Takimoto | C08G 65/20 |
| 2011/0112240 A1 | 5/2011 | Krauter et al. | |
| 2012/0309874 A1 * | 12/2012 | Takimoto | C08G 65/20 |
| | | | 524/120 |
| 2013/0096259 A1 * | 4/2013 | Bette | C08L 75/04 |
| | | | 525/185 |
| 2014/0350148 A1 † | 11/2014 | Takimoto | |
| 2014/0364546 A1 † | 11/2014 | Okamoto | |
| 2014/0358865 A1 | 12/2014 | van den Bogerd et al. | |
| 2015/0247003 A1 | 9/2015 | Bahn et al. | |
| 2016/0122533 A1 † | 5/2016 | Tomita | |
| 2016/0272758 A1 | 9/2016 | Takimoto et al. | |
| 2016/0326365 A1 † | 11/2016 | Sakaki | |

FOREIGN PATENT DOCUMENTS

| | | | |
|---|---|---|---|
| EP | 3243876 A1 † | 11/2017 | |
| JP | 2006-045548 A | 2/2006 | |
| JP | 2008-045131 A | 2/2008 | |
| JP | 4069364 B2 | 4/2008 | |
| JP | 2008-163070 A | 7/2008 | |
| JP | 2009-013393 A | 1/2009 | |
| JP | 2015-025068 A | 2/2015 | |
| JP | 5699188 | 2/2015 | |
| JP | 2015-093913 A | 5/2015 | |
| JP | 2015-093914 A | 5/2015 | |
| KR | 2012-0101702 A | 9/2012 | |
| KR | 2013-0090372 A | 8/2013 | |
| KR | 2014-0010722 A | 1/2014 | |
| KR | 10-1499245 A | 3/2015 | |
| KR | 2015-0026965 A | 3/2015 | |
| TW | 201529717 A | 8/2015 | |

\* cited by examiner
† cited by third party

*Primary Examiner* — Michael M Bernshteyn
(74) *Attorney, Agent, or Firm* — Dentons US LLP

(57) ABSTRACT

The present invention relates to a polycarbonate resin composition and an optical molded product comprising the same. The polycarbonate resin composition according to the present invention is excellent in transmittance and color uniformity which are required for a light guide plate, and also excellent in processability. Thus, it can be effectively used as a material of the light guide plate.

16 Claims, No Drawings

POLYCARBONATE RESIN COMPOSITION AND OPTICAL MOLDED PRODUCT COMPRISING THE SAME

CROSS-REFERENCE TO RELATED APPLICATION(S)

This application is a National Stage Application of International Application No. PCT/KR2016/003339 filed on Mar. 31, 2016, which claims the benefit of priority to Korean Patent Application No. 10-2014-0173005 filed on Dec. 4, 2014, Korean Patent Application No. 10-2015-0170782 filed on Dec. 2, 2015, and Korean Patent Application No. 10-2016-0038477 filed on Mar. 30, 2016, the entire contents of which are incorporated herein by reference.

TECHNICAL FIELD

The present invention relates to a polycarbonate resin composition which is excellent in transmittance, color uniformity and processability, and an optical molded product comprising the same.

BACKGROUND OF ART

With the recent trend toward the thinning and upsizing of a liquid crystal display device, the thickness of the components used therefor becomes increasingly thinner. The liquid crystal display device is equipped with a backlight that is a luminous body portion emitting light behind the LCD, and a light guide plate and a diffusion plate are used to diffuse or transfer light, depending on the type or position of the light source. The thickness of the light guide plate becomes increasingly thinner in accordance with the recent trend. For the general level of the light guide plate that is actually used, the thickness is around 0.5 mm, but the thinnest is up to about 0.3 mm, and the thickness tends to be thinner in the future.

Instead of a cold cathode fluorescent lamp (CCFL) mainly used in accordance with the thinning trend, an edge-type backlight unit equipped with LED in the edge portion of the backlight has been increasingly used. The edge-type backlight unit enables light started from a light source equipped in the edge portion to transmit through a light guide plate, and part of the light transmitted through the plate is scattered by the light scattering layer applied to the surface of the plate, thereby lightening a liquid crystal display device by a surface light source where the whole surface uniformly emits light. Such light scattering layer is formed by transferring or printing a dot pattern on the surface of the light guide plate, and recently, a prism structure of a microstructure may be transferred in order to increase the light efficiency.

Since the light guide plate requires a high light transmittance, PMMA, which is an acryl-based resin, has generally been used as the material of the light guide plate. The acryl-based resin has a high light transmittance, but it has insufficient mechanical strength and thus is not suitable to apply to a thin light guide plate, and them is a disadvantage that it is vulnerable to heat generated from electronic devices, due to low heat resistance thereof.

Polycarbonate has attracted attention in place of such acryl-based resin. The polycarbonate has excellent mechanical strength as compared with the acrylic resin and thus can be used as a material of a thin light guide plate. Also, the polycarbonate has excellent heat resistance, flame retardancy and thus is gradually replacing the acrylic resin in LED-applied backlight unit and lighting apparatus with a large heating value. However, since the polycarbonate has a low light transmittance as compared with the acrylic resin, there is a need to have a light transmittance corresponding to the acrylic resin while maintaining the advantages of the polycarbonate.

In this regard, Japanese Patent Application Publication No. 2008-045131 has suggested that among acryl-based resins, PMMA having a viscosity average molecular weight (Mv) of 20,000 to 60,000 is blended with polycarbonate having Mv of 15,000 to 40,000 to achieve an excellent light conductivity. However, there is still a need to improve physical properties such as heat resistance.

Thus, the present inventors have conducted numerous studies to develop the materials that can be used as a material of a light guide plate, and found that, as described below, a resin composition comprising polycarbonate and polyoxytetramethylene-polyoxypropylene glycol random copolymer is excellent in light transmittance, heat resistance and the like and thus can be used as a material of the light guide plate, thereby completing the present invention.

DETAILED DESCRIPTION OF THE INVENTION

Technical Problem

It is an object of the present invention to provide a polycarbonate resin composition having excellent transmittance, color uniformity and processability.

It is another object of the present invention to provide an optical molded product comprising the above-mentioned polycarbonate resin composition.

Technical Solution

In order to achieve these objects, the present invention provides a polycarbonate resin composition comprising 100 parts by weight of polycarbonate; and 0.05 to 5 parts by weight of polyoxytetramethylene-polyoxypropylene glycol random copolymer represented by the following Chemical Formula 1:

[Chemical Formula 1]

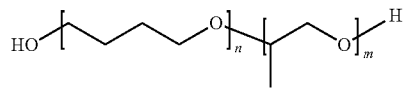

in Chemical Formula 1, n and m are each independently an integer of 1 or more, and n+m is 20 or more and less than 100.

Polycarbonate

As used herein, the term. "polycarbonate" refers to a polymer that is prepared by reacting a diplenol-based compound, a phosgene, a carbonate ester, or a combination thereof. The polycarbonate is excellent in heat resistance, impact resistance, mechanical strength, transparency and the like and thus is widely used in the preparation of a compact disk, a transparent sheet, a packaging material, an automobile bumper, a UV-blocking film and the like, particularly in the present invention, it is used as a material of the light guide layer.

Examples of the diphenol-based compound may include hydroquinone, resorcinol, 4,4'-dihydroxydiphenyl, 2,2-bis (4-hydroxyphenyl)propane (referred to as "bisphenol-A"), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Preferably, 4,4'-dihydroxydiphenyl, or 2,2-bis(4-hydroxyphenyl)propane may be used. In this case, the structure of polycarbonate is represented by the following Chemical Formula 2:

[Chemical Formula 2]

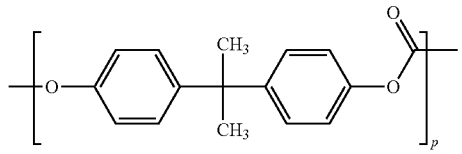

in Chemical Formula 2, p is an integer of 1 or more.

The polycarbonate may be a mixture of copolymers prepared from two or more diphenols. Also, the polycarbonate may include a linear polycarbonate, a branched polycarbonate, a polyester carbonate copolymer resin and the like.

The linear polycarbonate may include a polycarbonate or the like which is prepared from bisphenol-A. The branched polycarbonate may include those prepared by reacting a polyfunctional aromatic compound such as trimellitic anhydride, trimellitic acid with diphenols and carbonates. The polyfunctional aromatic compound may be included in an amount of 0.05 to 2 mol %, based on the total amount of the branched polycarbonate. The polyester carbonate copolymer resins may include those prepared by reacting a difunctional carboxylic acid with diphenols and carbonates. The carbonates may include diaryl carbonate such as diphenyl carbonate, and ethylene carbonate or the like.

Preferably, the polycarbonate has a weight average molecular weight of 14,000 g/mol to 30,000 g/mol. Within the above range, the moldability and workability are excellent at the time of preparing a thin film product. In this specification, examples of a method for measuring a weight average molecular weight is not particularly limited, but for example, a weight average molecular weight in terms of polycarbonate (example of standard material: bisphenol A linear PC) measured by GPC (gel permeation chromatography) method can be used. In the course of measuring a weight average molecular weight in terms of polycarbonate measured by the GPC method, it is possible to use a detector and an analytical column, such as the commonly known analysis apparatus (example of GPC measurement apparatus: Agilent 1200 series) and differential refractive index detector, and also commonly applied temperature conditions, solvent, and flow rate can be used. Specific examples of the measurement conditions may include a temperature of 25° C. a tetrahydrofuran solvent and a flow rate of 1 mL/min.

Polyoxytetratnethylene-Polyoxypropylene Glycol Random Copolymer

On the other hand, the polycarbonate is relatively excellent in mechanical properties, electrical properties, and weather resistance as compared with other kinds of resins and thus can be used as the light guide plate in itself. However, since the polycarbonate is slightly low in the light transmittance which should be importantly considered in the light guide plate, there is a need to improve this property. Thus, in the present invention, the polycarbonate is used together with polyoxytetramethylene-polyoxypropylene glycol random copolymer represented by the following Chemical Formula 1:

[Chemical Formula 1]

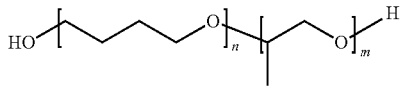

in Chemical Formula 1, n and m are each independently an integer of 1 or more, and n+m is 2.0 or more and less than 100.

As used herein, the term "polyoxytetramethylene-polyoxypropylene glycol random copolymer" refers to a polymer that is prepared by randomly copolymerizing tetrahydrofuran and propylene oxide. From this point of view, the repeating units between square brackets in Chemical Formula 1 should be understood as being randomly arranged with one another.

There was an attempt to improve a light transmittance from the light guide plate by adding a conventional polyoxyalkylene glycol. However, since polyoxypropylene glycol has high compatibility with polycarbonate but has low heat resistance, it would cause a problem that the light transmittance is decreased due to high temperature during production of the light guide plate. Also, since polyoxytetramethylene glycol has high heat resistance but is poor in compatibility with polycarbonate, it is difficult to improve the light transmittance.

However, the polyoxytetramethylene-polyoxypropylene glycol random copolymer containing all of the respective repeating units as in the present invention supplement disadvantages of the respective polyoxyalkylene glycol from each other, thereby improving both heat resistance and light transmittance.

According to one embodiment of the present invention, it could be confirmed that Examples using polyoxytetramethylene-polyoxypropylene glycol random copolymer exhibit significantly improved heat resistance and light transmittance as compared with comparative examples using polyoxypropylene glycol and polyoxytetramethylene glycol.

The polyoxytetramethylene-polyoxypropylene glycol random copolymer is included in an amount of 0.05 to 5 parts by weight, preferably 0.3 to 1.0 parts by weight, based on 100 parts by weight of the polycarbonate. When the amount of the copolymer is less than 0.05 parts by weight, the degree of improvement of heat resistance and light transmittance is insignificant, and when the amount of the copolymer is greater than 5 parts by weight, the properties of polycarbonate may be decreased.

In addition, the polyoxytetramethylene-polyoxypropylene glycol random copolymer has preferably a weight average molecular weight of 1,000 g/mol to 4,000 g/mol. Within the above range, the physical properties of the light guide plate can be effectively improved.

Epoxy Group-Containing Vinyl-Based Polymer

On the other hand, the polycarbonate is relatively excellent in mechanical properties, electrical properties and weather resistance as compared with other kinds of resins, and thus can be used as a light guide plate in itself. However, since the polycarbonate has low long-term color stability under high temperature and high humidity conditions which should be considered important in the light guide plate, there is a need to improve this property. Thus, the polycarbonate can be used together with the vinyl-based polymer containing (meth)acrylate repeating unit containing an epoxy functional group.

As used herein, the term "(meth)acryl" refers to acryl and methacryl. In other words, the term "(meth)acrylate" should be understood to refer to acrylate or methacrylate.

According to one embodiment of the present invention, it could be confirmed that the polycarbonate resin composition comprising a vinyl-based polymer containing a (meth)acrylate repeating unit containing an epoxy functional group maintains relatively excellent color stability even after being left for a long period of time under high temperature and high humidity conditions.

The vinyl-based polymer containing (meth)acrylate repeating unit containing an epoxy functional group is included in an amount of 0.001 to 5 parts by weight, preferably 0.015 to 2.5 parts by weight, based on 100 parts by weight of the polycarbonate. When the amount of the vinyl-based polymer is less than 0.001 pans by weight, the degree to which the color stability can be maintained for a long period of time under high temperature and high humidity conditions is insignificant, and when the amount of the vinyl-based polymer is greater than 5 parts by weight, the properties of the polycarbonate may be decreased.

Further, the vinyl-based polymer containing (meth)acrylate repeating unit containing an epoxy functional group has preferably a weight average molecular weight of 1,000 g/mol to 10,000 g/mol. Within the above range, the physical properties of the light guide plate can be effectively improved.

Specifically, the epoxy group-containing vinyl-based polymer may include a (meth)acrylate repeating unit containing an epoxy functional group. In the (meth)acrylate repeating unit containing an epoxy functional group, the epoxy functional group may be bonded to the terminal of the branched chain of the (meth)acrylate repeating unit.

The (meth)acrylate repeating unit may include a main chain formed through polymerization between vinyl-based functional groups, and a branched chain extended from the main chain in the shape of branches. The epoxy functional group may form_ a bond at the terminal of the branched chain of the (meth)acrylate repeating unit.

More specifically, the (meth)acrylate repeating unit containing an epoxy functional group may include a repeating unit represented by the following Chemical Formula 3:

[Chemical Formula 3]

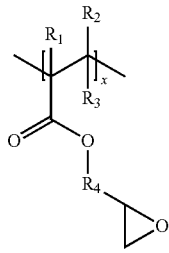

in Chemical Formula 3, $R_1$, $R_2$ and $R_3$ are the same or different from each other, and each independently hydrogen; or a linear or branched alkyl group having 1 to 10 carbon atoms, $R_4$ is a linear or branched alkylene group having 1 to 10 carbon atoms, and x is an integer ranging from 1 to 20.

The alkyl group is a monovalent functional group derived from alkane, and examples thereof may include methyl, ethyl, propyl, isobutyl, sec-butyl, tert-butyl, pentyl, hexyl and the like. The alkylene group is a divalent functional group derived from alkane, and examples thereof may include a methylene group, an ethylene group, a propylene group, an isobutylene group, a sec-butylene group, a tert-butylene group, a pentylene group, a hexylene group, and the like.

The alkyl group or alkylene group may be substituted or unsubstituted, and the term "substituted" means that a hydrogen atom included in an alkyl group or an alkylene group is replaced with a specific functional group. Examples of the substituted functional group is not particularly limited, and various functional groups or atomic groups widely known in the art, for example, an alkyl group having 1 to 10 carbon atoms, an alkenyl group having 2 to 10 carbon atoms, an alkynyl group having 2 to 10 carbon atoms, an aryl group having 6 to 12 carbon atoms, a heteroaryl group having from 2 to 12 carbon atoms, an arylalkyl group having 6 to 12 carbon atoms, a halogen atom, a cyano group, an amino group, an amidino group, a nitro group, an amide group, a carbonyl group, a hydroxy group, a sulfonyl group, a carbamate group, an alkoxy group having 1 to 10 carbon atoms and the like can be used.

Further, the epoxy group-containing vinyl-based polymer may have an epoxy equivalent weight of 100 g/mol to 500 g/mol or 200 g/mol to 400 g/mol. Thus, as a specific amount of epoxy functional group is included in the epoxy group-containing vinyl-based polymer, excellent color stability can be maintained even after being left for a long period of time under high temperature and high humidity conditions.

The epoxy group-containing vinyl-based polymer may further comprise an aromatic vinyl-based repeating unit or a (meth)acryl-based repeating unit. That is, the epoxy group-containing vinyl-based polymer may include, for example, a copolymer containing one or more repeating units selected from the group consisting of a (meth)acrylate repeating unit containing an epoxy functional group; an aromatic vinyl-based repeating unit; and a (meth)acryl-based repeating unit.

The aromatic vinyl-based repeating unit refers to a repeating unit derived from an aromatic vinyl-based monomer, and specifically, it refers to a repeating unit constituting a polymer that is formed through polymerization between aromatic vinyl-based monomers. The aromatic vinyl monomer is a compound having one vinyl double bond and one or more benzene nuclei in the same molecule, and specific examples of the aromatic vinyl monomer are not particularly limited, but for example, they may include compounds such as styrene, alpha-methyl styrene, 2-methyl styrene, 3-methyl styrene, 4-methyl styrene, 4-ethyl styrene, t-butyl styrene, 2,5-dimethyl styrene, 1,3-dimethyl styrene, 2,4-dimethyl styrene, 4-methoxy styrene, 4-ethoxy styrene, 4-propoxy styrene, 4-butoxy styrene, chlorostyrene, dichlorostyrene, trichlorostyrene, vinyl toluene, bromostyrene, dibromostyrene, tribromostyrene, vinyl naphthalene, isopropenyl naphthalene, isopropenyl biphenyl, divinyl benzene, alpha-methyl styrene vinyl toluene and the like.

More specifically, the aromatic vinyl-based repeating unit may include a repeating unit represented by the following Chemical Formula 4:

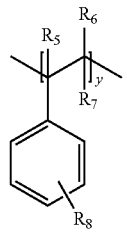

[Chemical Formula 4]

in Chemical Formula 4, $R_5$ to $R_8$ are the same or different from each other, and each independently hydrogen; or a linear or branched alkyl group having 1 to 10 carbon atoms, and y is an integer ranging from 1 to 20. The functional group of $R_8$ may be bonded to at least one or more of carbons at the remaining positions 2 to 6 excluding carbon at position 1 to which the vinyl-based functional groups are bonded in the benzene ring. The content about the alkyl group includes the content described above for Chemical Formula 3.

The (meth)acryl-based repeating unit refers to a repeating unit derived from (meth)acryl-based monomer. Specifically, it refers to a repeating unit constituting the polymer formed through polymerization between (meth)acryl-based monomers. The (meth)acryl-based monomer refers to a compound containing the (meth)acryl-based functional group, and specific examples thereof are not particularly limited, and for example, a (meth)acrylate compound or a (meth)acrylic acid compound may be included.

More specifically, the (meth)acryl-based repeating unit may include a repeating unit represented by the following Chemical Formula 5:

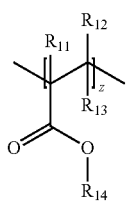

[Chemical Formula 5]

in Chemical Formula 5, $R_{11}$ to $R_{14}$ are the same or different from each other, and each independently hydrogen; or a linear or branched alkyl group having 1 to 1.0 carbon atoms, and z is an integer ranging from 1 to 20. The content about the alkyl group includes the content described above for Chemical Formula 3.

Polycarbonate Resin Composition

The polycarbonate resin composition according to the present invention comprises 100 parts by weight of polycarbonate; and 0.05 to 5 parts by weight of polyoxytetramethylene-polyoxypropylene glycol random copolymer represented by Chemical Formula 1.

Also, the polycarbonate resin composition according in the present invention comprises 100 parts by weight of polycarbonate; 0.05 to 5 parts by weight of polyoxytetramethylene-polyoxypropylene glycol random copolymer represented by Chemical Formula 1; and 0.001 to 5 parts by weight of vinyl-based polymer containing (meth)acryl-based repeating unit containing an epoxy functional group.

In addition, if necessary, the polycarbonate resin composition may include one or more additives selected from the group consisting of an antioxidant, a thermal stabilizer, a plasticizer, an antistatic agent, a nucleating agent, a flame retardant, a lubricant, an impact modifier, a fluorescent brightener and an ultraviolet absorber which are commonly used in the art.

The polycarbonate resin composition can be prepared by mixing polycarbonate, polyoxytetramethylene-polyoxypropylene glycol random copolymer, and optionally an additive. Alternatively, the polycarbonate resin composition can be prepared by mixing polycarbonate, polyoxytetramethylene-polyoxypropylene glycol random copolymer, vinyl-based polymer containing (meth)acrylate repeating unit containing an epoxy functional group, and optionally an additive. In order to produce an optical molded product, it is desirable to produce the pellets by performing melt-kneading, as described below.

The melt-kneading may be performed by methods commonly used in the art, for example, methods using a ribbon blender, a Henschel mixer, a Banbury mixer, a drum tumbler, a single screw extruder, a twin screw extruder, a co-kneader, a multi-screw extruder and the like. The temperature of the melt-kneading may be adjusted appropriately as needed, and preferably it can be adjusted to a temperature of 200° C. to 300° C.

Optical Molded Product

Further, the present invention provides an optical molded product comprising the above-mentioned polycarbonate resin composition. Preferably, the optical molded product is a light guide plate.

As used herein, the term "light guide plate" refers to a component providing luminance and uniform lightening of a backlight unit of the liquid crystal display device. Since light is transmitted to the light guide plate, transparency, i.e., light transmittance should be excellent. In addition, since a high temperature is required during molding and operation of the light guide plate, a high heat resistance is necessary.

Therefore, since the polycarbonate resin composition according to the present invention is excellent in light transmittance and heat resistance required for the light guide plate, it can be effectively used as a light guide plate.

The method for preparing a light guide plate may be carried out by methods commonly used in the art. For example, the light guide plate can be prepared by applying a melt-kneaded mixture or pellet of the resin composition according to the present invention as a raw material to molding methods such as an injection molding method, an injection compression molding method, an extrusion molding method, a vacuum molding method, a blow molding method, a press molding method, a pressure forming method, a foam molding method, a thermal bending molding method, a compression molding method, a calender molding method, and a rotational molding method.

The thickness of the light guide plate can be appropriately adjusted in accordance with the purpose of use, and the shape of the light guide plate may also have a flat plate or a curved shape in accordance with the purpose of use.

Advantageous Effects

The polycarbonate resin composition according to the present invention is excellent in transmittance and color uniformity which are required for a light guide plate, and also excellent in processability. Thus, it can be effectively used as a material of the light guide plate.

DETAILED DESCRIPTION OF THE EMBODIMENTS

Below, preferred embodiments will be provided in order to assist in the understanding of the present invention.

However, these examples are provided only for illustration of the present invention, and it should not be construed as limiting the scope of the present invention to these examples.

<Materials Used>

The following materials were used in examples and comparative examples below.

Polycarbonate Resin(PC)

Bisphenol A linear polycarbonate having a weight average molecular weight of 16,000 g/mol and MFR (300° C., 1.2 kg) of 120 g/min was used.

Polyoxytetramethylene-Polyoxypropylene Glycol Random Copolymer

Polycerin DCB-2000 having a weight average molecular weight of 2,000 g/molm, available from NOF Corporation, or Polycerin DCB-4000 having a weight average molecular weight of 4,000 g/mol, available from NOF Corporation, was used.

Epoxy Group-Containing Vinyl-Based Polymer

Joncryl ADR-4370F (epoxy equivalent weight: 285 g/mol) having a weight average molecular weight of 6,800 g/mol, available from BASF, was used.

Polyoxypropylene Glycol(PPG)

Uniol D-2000 available from NOF Corporation was used.

Polyoxytetramethylene Glycol(PTMG)

PTMG 2000 available form KPX Chemical Company was used.

Polyoxypropylene Glycol Distearate

NKL 9520 available from NOF Corporation was used.

Polyoxytetramethylene-Polyoxyehtylene Glycol Random Copolymer

Polycerin DC-1800E having a weight average molecular weight of 1,800 g/mol, available from NOF Corporation, was used.

EXAMPLES AND COMPARATIVE EXAMPLES

The respective components were mixed in an amount as described in Table 1 below, and extruded at a rate of 80 kg per hour with a twin-screw extruder (L/D=36, Φ=45, barrel temperature: 240° C.) to produce pellets.

TABLE 1

| Classification | PC | Polycerin DCB-2000 | Polycerin DCB-4000 | Joncryl ADR-4307F | PPG | PTMG | MKL 9520 | Polycerin DC-1800E |
|---|---|---|---|---|---|---|---|---|
| Example 1 | 100 | 0.3 | — | — | — | — | — | — |
| Example 2 | 100 | 0.4 | — | — | — | — | — | — |
| Example 3 | 100 | 0.8 | — | — | — | — | — | — |
| Example 4 | 100 | — | 0.3 | — | — | — | — | — |
| Example 5 | 100 | 0.3 | — | 0.025 | — | — | — | — |
| Example 6 | 100 | 0.3 | — | 0.05 | — | — | — | — |
| Example 7 | 100 | 0.3 | — | 0.075 | — | — | — | — |
| Example 8 | 100 | — | 0.3 | 0.05 | — | — | — | — |
| Comparative Example 1 | 100 | — | — | — | 0.3 | — | — | — |
| Comparative Example 2 | 100 | — | — | — | — | 0.3 | — | — |
| Comparative Example 3 | 100 | — | — | — | — | — | 0.3 | — |
| Comparative Example 4 | 100 | — | — | — | — | — | — | 0.3 |

The physical properties of the pellets thus prepared were measured in accordance with the following methods.

Experimental Examples

Experimental Example 1: Color Heat Resistance (ΔYI)

The respective resin pellets prepared in the examples and comparative examples were injection-molded without residence time at a cylinder temperature of 320° C. using an injection molding machine N-20C (manufactured by JSW, Ltd.) to prepare a specimen (width/length/thickness=60 mm/40 mm/3 mm), and YI value (320° C.) was measured using Color-Eye 7000A (manufactured by X-Rite Ltd.) in accordance with ASTM D1925.

Also, the respective resin pellets prepared in the examples and comparative examples were injection-molded without residence time at a cylinder temperature of 250° C. using an injection molding machine N-20C (manufactured by JSW, Ltd.) to prepare a specimen (width/length/thickness=60 mm/40 mm/3 mm), and YI value (250° C.) was measured using Color-Eye 7000A (manufactured by X-Rite Ltd.) in accordance with ASTM D1925.

In addition, the value obtained by subtracting YI value (250° C.) from YI value (320° C.) was evaluated as a color heat resistance (ΔYI), and the results are shown in Table 2 below.

Experimental Example 2: Transmittance of Long-Wavelength Light (T %) and Color of Long-Wavelength Light (YI)

The respective resin pellets prepared in the examples and comparative examples were injection-molded without residence time at a cylinder temperature of 320° C. using an injection molding machine N-20C (manufactured by JSW, Ltd.) to prepare a specimen (width/length/thickness=150 mm/80 mm/4 mm), and transmittance of long-wavelength light (T %) and color of long-wavelength light (YI) were measured by irradiating light of 380 to 780 nm along the transverse direction of the specimens using a spectrophotometer U-4100 available from Hitachi, Ltd. The results thus obtained are shown in Table 2 below. The color of long-wavelength light was measured in accordance with JIS Z8722.

TABLE 2

Measurement results of Experimental Examples 1 and 2

| Classification | Color heat resistance (ΔYI) | Color of long-wavelength light (YI) | Transmittance of long-wavelength light (T %) |
|---|---|---|---|
| Example 1 | 0.16 | 5.31 | 84.63 |
| Example 2 | 0.11 | 5.13 | 84.90 |
| Example 3 | 0.11 | 5.06 | 85.04 |
| Example 4 | 0.17 | 5.69 | 84.21 |
| Example 5 | 0.13 | 5.21 | 84.74 |
| Example 6 | 0.12 | 5.15 | 84.85 |
| Example 7 | 0.14 | 5.26 | 84.69 |
| Example 8 | 0.14 | 5.27 | 84.68 |
| Comparative Example 1 | 0.31 | 6.21 | 83.11 |
| Comparative Example 2 | 0.28 | 6.85 | 82.18 |
| Comparative Example 3 | 0.41 | 8.54 | 81.56 |
| Comparative Example 4 | 0.29 | 7.18 | 83.21 |

As shown in Table 2 above, it could be confirmed that in the case of examples according to the present invention, the width of a color change caused by heat (ΔYI) was low to less than 0.20 and thus, the examples showed excellent color heat resistance as compared with comparative examples in which color was greatly changed to greater than 0.25.

Further, it could be confirmed that in the case of the examples, the color of long-wavelength light was measured to be lower as compared with comparative examples and thus, possible to stably implement a color tone while having relatively uniform color in the visible light region and that the examples showed higher transmittance of long-wavelength light as compared with comparative examples and thus it was possible to implement excellent optical properties when applied to a light guide plate.

Experimental Example 3: Long-Term Color Stability (ΔYI')

The respective resin pellets prepared in Examples 1, 4 to 8 were injection-molded without residence time at a cylinder temperature of 320° C. using an injection molding machine N-20C (manufactured by JSW, Ltd.) to prepare a specimen (width/length/thickness=60 mm/40 mm/3 mm), and an initial YT value was measured using Color-Eye 7000A (manufactured by X-Rite Ltd.) in accordance with ASTM D1925.

Subsequently, the specimens were left to stand at a temperature of 85° C. and 85% humidity. Every time point when 1 day; 2 days; 3 days; 4 days; 5 days; 6 days has passed, YT values were measured using Color-Eye 7000A (manufactured by X-Rite Ltd.) in accordance with ASTM D1925.

Further, at time point when 1 day; 2 days; 3 days; 4 days; 5 days; 6 days have passed, the value obtained by subtracting an initial YT value from a YT value from each time point was evaluated as a long-term color stability (ΔYI'), and the results are shown in Table 3 below.

TABLE 3

Measurement results of Experimental Example 3

| Classification | After 1 day | After 2 days | After 3 days | After 4 days | After 5 days | After 6 days |
|---|---|---|---|---|---|---|
| Example 1 | 0.13 | 0.09 | 0.21 | 0.34 | 0.46 | 0.58 |
| Example 4 | 0.14 | 0.10 | 0.23 | 0.37 | 0.50 | 0.64 |
| Example 5 | 0.09 | 0.05 | 0.10 | 0.14 | 0.19 | 0.25 |
| Example 6 | 0.08 | 0.03 | 0.06 | 0.09 | 0.13 | 0.16 |
| Example 7 | 0.09 | 0.06 | 0.12 | 0.19 | 0.24 | 0.30 |
| Example 8 | 0.09 | 0.06 | 0.11 | 0.17 | 0.23 | 0.28 |

As shown in Table 3 above, it could be confirmed that in the case of Examples according to the present invention, excellent color stability was maintained for a long period of time under high temperature and high humidity conditions. In particular, it could be confirmed that in the case of Examples 5 to 8 containing Joncryl ADR-4370F, an epoxy group-containing vinyl-based polymer, the color change value was shown to be low to 0.30 or less even after the lapse of 6 days, thereby exhibiting excellent color stability.

The invention claimed is:

1. A polycarbonate resin composition comprising 100 parts by weight of polycarbonate; and 0.05 to 5 parts by weight of polyoxytetramethylene-polyoxypropylene glycol random copolymer represented by the following Chemical Formula 1:

[Chemical Formula 1]

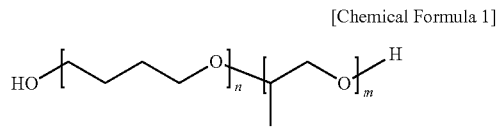

in Chemical Formula 1,
n and m are each independently an integer of 1 or more, and
n+m is 20 or more and less than 100.

2. The polycarbonate resin composition according to claim 1, wherein the polycarbonate has a weight average molecular weight of 14,000 g/mol to 30,000 g/mol.

3. The polycarbonate resin composition according to claim 1, wherein the polycarbonate includes a repeating unit represented by the following Chemical Formula 2:

[Chemical Formula 2]

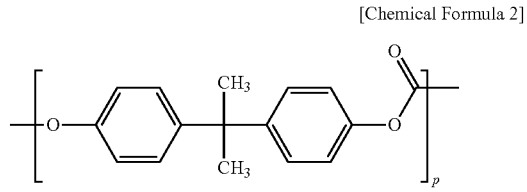

in Chemical Formula 2,
p is an integer of 1 or more.

4. The polycarbonate resin composition according to claim 1, wherein the polyoxytetramethylene-polyoxypropylene glycol random copolymer has a weight average molecular weight of 1,000 g/mol to 4,000 g/mol.

5. The polycarbonate resin composition according to claim 1, wherein the polyoxytetramethylene-polyoxypropylene glycol random copolymer is included in an amount of 0.3 to 1.0 parts by weight, based on 100 parts by weight of the polycarbonate.

6. The polycarbonate resin composition according to claim 1, further comprising 0.001 to 5 parts by weight of a vinyl-based polymer containing (meth)acrylate repeating unit containing an epoxy functional group, based on 100 parts by weight of the polycarbonate.

7. The polycarbonate resin composition according to claim 6, wherein the epoxy functional group is bonded to a terminal of a branched chain of the (meth)acrylate repeating unit.

8. The polycarbonate resin composition according to claim 6, wherein the (meth)acrylate repeating unit containing the epoxy functional group includes a repeating unit represented by the following Chemical Formula 3:

[Chemical Formula 3]

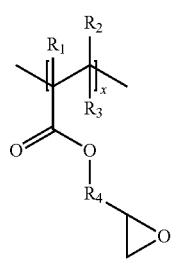

in Chemical Formula 3, $R_1$, $R_2$ and $R_3$ are each independently hydrogen; or a linear or branched alkyl group having 1 to 10 carbon atoms, $R_4$ is a linear or branched alkylene group having 1 to 10 carbon atoms, and x is an integer ranging from 1 to 20.

9. The polycarbonate resin composition according to claim 6, wherein the vinyl-based polymer further comprises an aromatic vinyl-based repeating unit or a (meth)acryl-based repeating unit.

10. The polycarbonate resin composition according to claim 9, wherein the aromatic vinyl-based repeating unit includes a repeating unit represented by the following Chemical Formula 4:

[Chemical Formula 4]

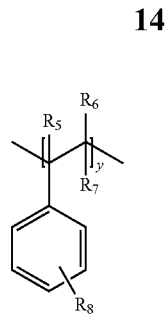

in Chemical Formula 4, $R_5$ to $R_8$ are each independently hydrogen; or a linear or branched alkyl group having 1 to 10 carbon atoms, and y is an integer ranging from 1 to 20.

11. The polycarbonate resin composition according to claim 9, wherein the (meth)acryl-based repeating unit includes a repeating unit represented by the following Chemical Formula 5:

[Chemical Formula 5]

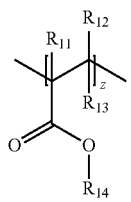

in Chemical Formula 5, $R_{11}$ to $R_{14}$ are each independently hydrogen; or a linear or branched alkyl group having 1 to 10 carbon atoms, and z is an integer ranging from 1 to 20.

12. The polycarbonate resin composition according to claim 6, wherein the vinyl-based polymer containing the (meth)acrylate repeating unit containing the epoxy functional group has a weight average molecular weight of 1,000 g/mol to 10,000 g/mol.

13. The polycarbonate resin composition according to claim 6, wherein the vinyl-based polymer containing the (meth)acrylate repeating unit containing the epoxy functional group has an epoxy equivalent weight of 100 g/mol to 500 g/mol.

14. The polycarbonate resin composition according to claim 1, wherein the polycarbonate resin composition includes one or more additives selected from the group consisting of an antioxidant, a thermal stabilizer, a plasticizer, an antistatic agent, a nucleating agent, a flame retardant, a lubricant, an impact modifier, a fluorescent brightener and an ultraviolet absorber.

15. An optical molded product comprising the polycarbonate resin composition according to claim 1.

16. The optical molded product according to claim 15, wherein the optical molded product is a light guide plate.

* * * * *